(12) United States Patent
Tuyls et al.

(10) Patent No.: US 7,384,073 B1
(45) Date of Patent: Jun. 10, 2008

(54) DISPOSABLE NONREMOVABLE TUBE FITTING

(75) Inventors: James M. Tuyls, Vacaville, CA (US); Juha K. Salmela, Citrus Heights, CA (US); Thomas R. Hecht, Winters, CA (US)

(73) Assignee: Automatic Bar Controls, Inc., Vacaville, CA (US)

( * ) Notice: Subject to any disclaimer, the term of this patent is extended or adjusted under 35 U.S.C. 154(b) by 70 days.

(21) Appl. No.: 10/836,967

(22) Filed: Apr. 30, 2004

(51) Int. Cl.
*F16L 41/00* (2006.01)
(52) U.S. Cl. .................... 285/208; 285/140.1; 411/340
(58) Field of Classification Search ................ 285/208, 285/205, 194, 23, 139.1, 139.3, 140.1; 411/340
See application file for complete search history.

(56) References Cited

U.S. PATENT DOCUMENTS

| | | | | |
|---|---|---|---|---|
| 1,012,073 A | * | 12/1911 | Glasgow | 411/340 |
| 2,945,705 A | * | 7/1960 | Murray | 411/340 |
| 4,482,172 A | * | 11/1984 | DeVera et al. | 285/140.1 |
| 5,798,021 A | * | 8/1998 | Stiles | 411/340 |
| 6,821,069 B2 | * | 11/2004 | Ikuta | 411/340 |

* cited by examiner

*Primary Examiner*—Aaron M Dunwoody
(74) *Attorney, Agent, or Firm*—Townsend and Townsend and Crew LLP

(57) ABSTRACT

Embodiments of the present invention are directed to a nonremovable tube fitting or member for insertion into a container to access the interior of the container. In one embodiment, the fitting includes a hollow body having a proximal end and a distal end. The hollow body is partially insertable from the distal end through the opening of the container. The hollow body includes a proximal cap near the proximal end. The proximal cap is larger in size than the opening of the container. The hollow body includes a hole extending from the proximal end in a direction toward the distal end for receiving the tube through the hole. A capture member is coupled with the hollow body. The capture member is movable between an expanded position and a contracted position. The capture member in the contracted position has a lateral dimension sufficiently small to be inserted through the opening of the container. The capture member moves to the expanded position upon insertion into the container. The capture member in the expanded position protrudes outwardly from a region near the distal end of the hollow body to prevent the hollow body from being pulled out through the opening and separated from the container.

9 Claims, 10 Drawing Sheets

DISPOSABLE NONREMOVABLE TUBE FITTING

CROSS-REFERENCES TO RELATED APPLICATIONS

Not Applicable

BACKGROUND OF THE INVENTION

The present invention relates generally to dispensing apparatus and methods and, more particularly, to a device and a method for insertion into a container to access the interior of the container for dispensing the content therein.

Dispensing apparatus dispense flowable materials such as beverages and condiments from sources that are provided in the form of bags, jugs, containers, or the like. A bag typically requires a box for support or a hook for hanging. In some cases, it is beneficial to use a more rigid container than a bag so as to eliminate the need for a support box or a hook. Different fittings are needed for coupling a flow line to different containers to pump the materials from the containers. It is desirable to provide a fitting that is easy and quick to use, and is cost effective to manufacture.

BRIEF SUMMARY OF THE INVENTION

Embodiments of the present invention are directed to a nonremovable tube fitting or member for insertion into a container to access the interior of the container. The nonremovable tube fitting has a capture member that is configured to move to a contracted position to render the nonremovable tube fitting partially insertable through an opening into the container. Upon insertion into the container, the capture member moves from the contracted position to the expanded position, and prevents the nonremovable tube fitting from being pulled out through the opening and separated from the container. A tubing is inserted through the interior of the nonremovable tube fitting to access the content of the container.

An aspect of the present invention is directed to a nonremovable tube fitting for providing access for a tube through an opening of a container to access an interior of the container. The fitting comprises a hollow body having a proximal end and a distal end. The hollow body is partially insertable from the distal end through the opening of the container. The hollow body includes a proximal cap near the proximal end. The proximal cap is larger in size than the opening of the container. The hollow body includes a hole extending from the proximal end in a direction toward the distal end for receiving the tube through the hole. A capture member is coupled with the hollow body. The capture member is movable between an expanded position and a contracted position. The capture member in the contracted position has a lateral dimension sufficiently small to be inserted through the opening of the container. The capture member moves to the expanded position upon insertion into the container. The capture member in the expanded position protrudes outwardly from a region near the distal end of the hollow body to prevent the hollow body from being pulled out through the opening and separated from the container.

In some embodiments, the capture member comprises a cross member extending outwardly from the hollow body in two generally opposite directions. The capture member comprises a proximal portion coupled with the proximal end of the hollow body and a flexible portion connected between the proximal portion and the cross member. The cross member is configured to bend at the flexible portion with respect to the proximal portion from the expanded position to the contracted position. The flexible portion is smaller in cross-section than the proximal portion. The cross member of the capture member is configured to be bent at the flexible portion and inserted through a slot of the hollow body in the contracted position, and to return to the expanded position after passing through the distal end of the hollow body. The proximal portion of the capture member includes a proximal head which is larger in cross-section than the slot of the hollow member to prevent the proximal portion from passing through the slot to the distal end of the hollow member.

In other embodiments, the capture member comprises one or more fingers extending outwardly from the hollow body. The capture member comprises a plurality of fingers which are generally evenly spaced circumferentially around the hollow body. Each finger in the expanded position is oriented generally toward the proximal end of the hollow body and forms an angle of about 20°-80° with an axis of the hollow body extending between the proximal end and the distal end of the hollow body. Each finger is configured to bend toward the proximal end of the hollow body to be substantially parallel to the axis of the hollow body in the contracted position.

In still other embodiments, the capture member comprises a plurality of legs extending from the hollow body in a distal direction oriented from the proximal end to the distal end, and a plurality of feet coupled with and extending outwardly from the legs. The capture member comprises a pair of legs disposed on opposite sides of the hole of the hollow body, and a pair of feet each extending from one of the pair of legs. Each foot in the expanded position is oriented generally toward the proximal end of the hollow body and forms an angle of about 20°-80° with the leg to which the foot is connected. Each foot is configured to bend toward the proximal end of the hollow body to be substantially parallel to the leg to which the foot is connected in the contracted position.

In specific embodiments, the hollow body includes tube retaining bards in the hole. The capture member is undeformed in the expanded position and is deformed in the contracted position, and is resiliently deformable from the undeformed position to the deformed position. The hollow body comprises at least one flexible rib extending generally radially and outwardly from a side of the hollow body. The hollow body may comprise a plurality of flexible rib extending generally radially and outwardly from the side of the hollow body and being distributed circumferentially around the side of the hollow body. The capture member is inserted through a slot provided in the hollow body. The slot may include an enlarged portion near the distal end which is larger than a portion of the slot near the proximal end.

Another aspect of the invention is directed to a method of installing a nonremovable tube fitting through an opening of a container to provide access for a tube into an interior of the container. The nonremovable tube fitting includes a hollow body having a proximal end and a distal end, the hollow body including a proximal cap near the proximal end. The proximal cap is larger in size than the opening of the container. The hollow body includes a hole extending from the proximal end in a direction toward the distal end for receiving the tube through the hole. The nonremovable tube fitting includes a capture member coupled with the hollow body. The method comprises partially inserting the nonremovable tube fitting from the distal end of the hollow body through the opening of the container. The capture member is movable to a contracted position during insertion of the nonremovable tube fitting through the opening of the container. The nonremovable tube fitting is inserted sufficiently far into the container to allow the capture member to move from the contracted position to an expanded position. The capture member in the expanded position protrudes outwardly from the hollow body to prevent the hollow body from being pulled out through the opening and separated from the container.

DETAILED DESCRIPTION OF THE INVENTION

Figures 1, 2, 3, 4:
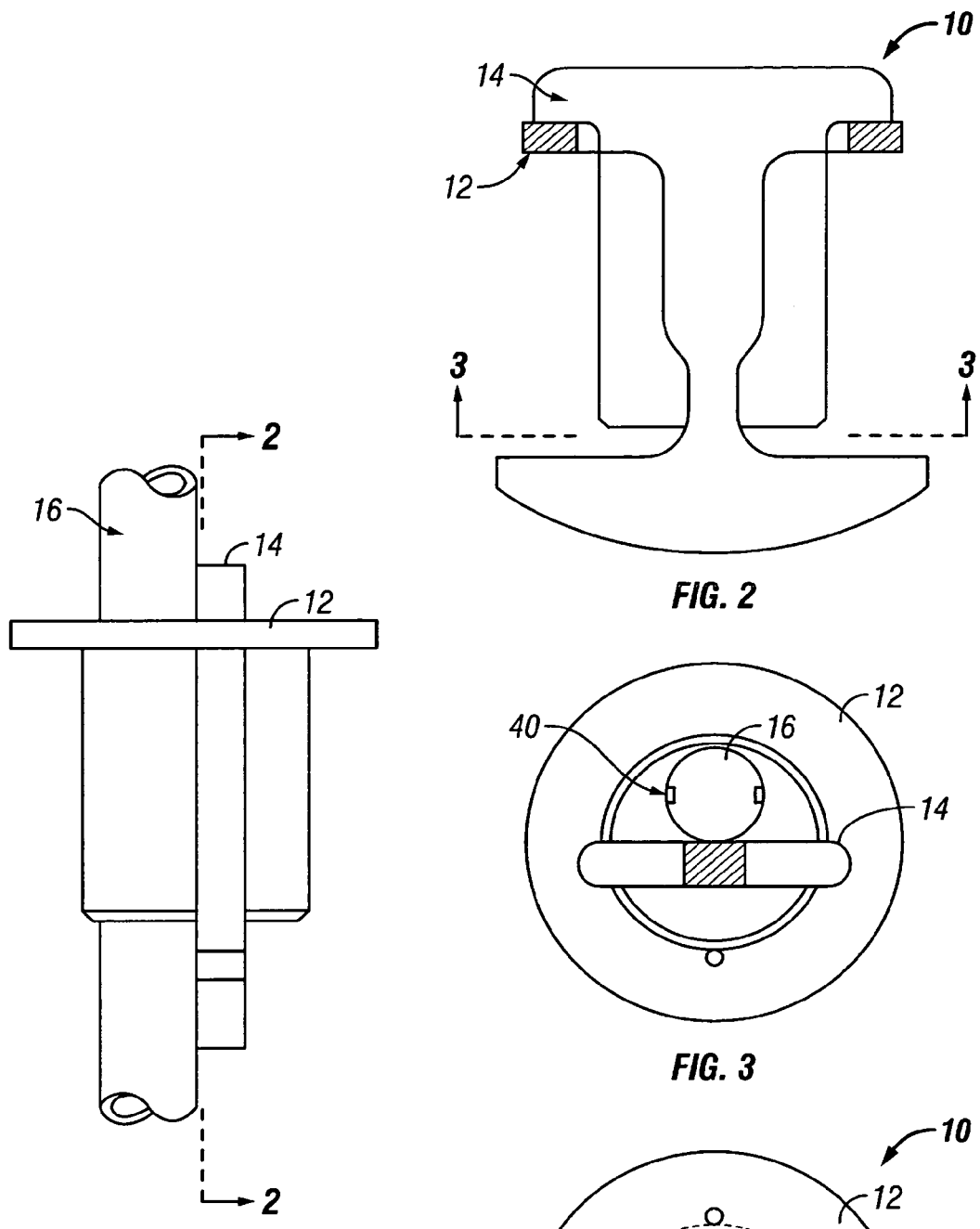
FIG. 1 is an elevational view of the nonremovable tube fitting according to an embodiment of the present invention.
FIG. 2 is a partial cross-sectional view of the nonremovable tube fitting of FIG. 1 along 2-2.
FIG. 3 is a partial cross-sectional bottom view of the nonremovable tube fitting of FIG. 2 along 3-3.
FIG. 4 is a top plan view of the nonremovable tube fitting of FIG. 2.
Figure 5:
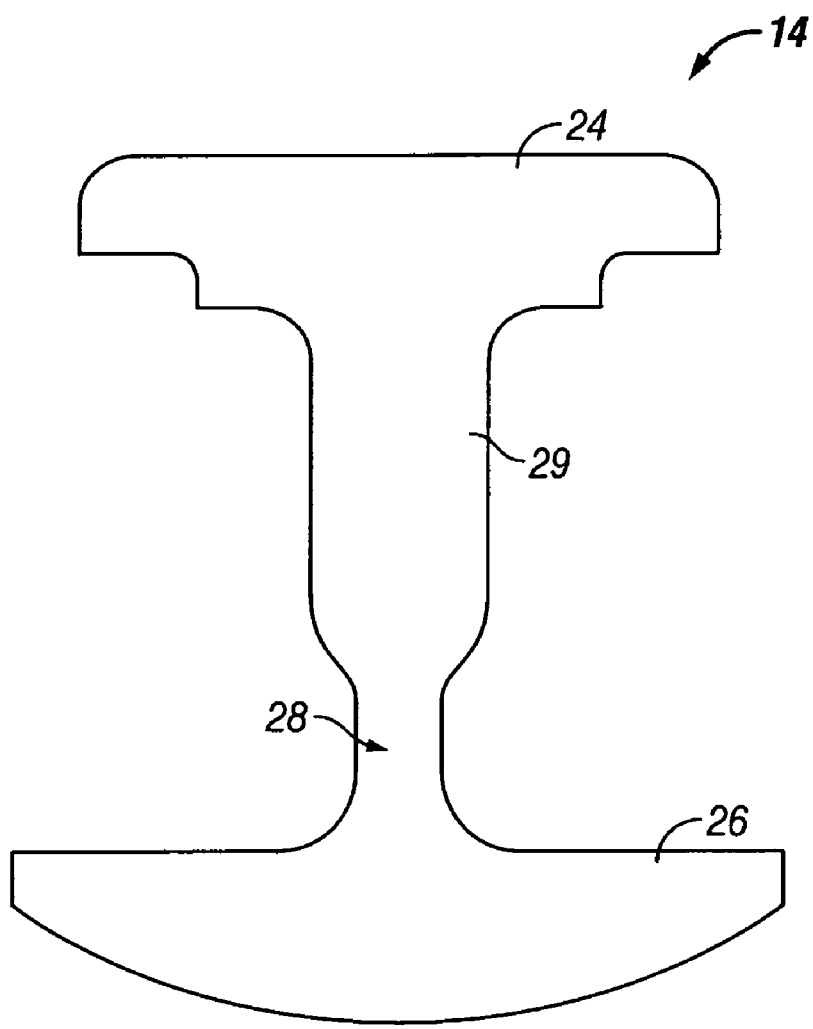
FIG. 5 is an elevational view of the anchor in the nonremovable tube fitting of FIG. 1 according to one embodiment.
Figure 6:
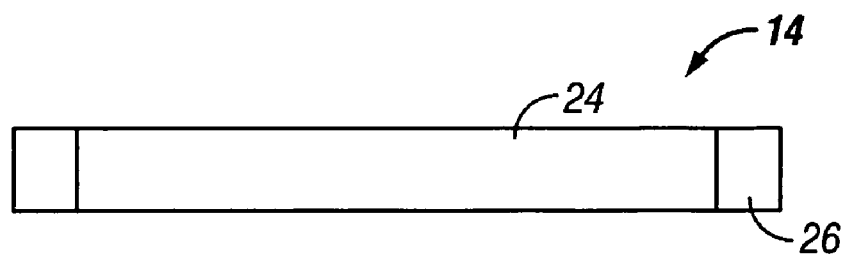
FIG. 6 is a top plan view of the anchor of FIG. 5.
Figure 7:
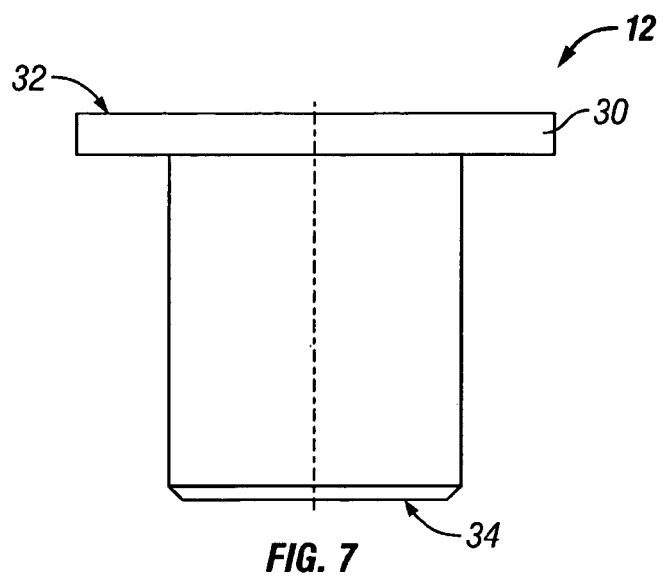
FIG. 7 is an elevational view of the anchor ring in the nonremovable tube fitting of FIG. 1 according to one embodiment.
Figure 8:
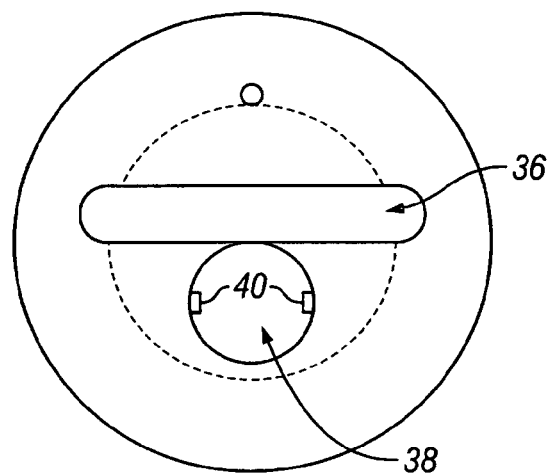
FIG. 8 is a top plan view of the anchor ring of FIG. 7.
Figure 9:
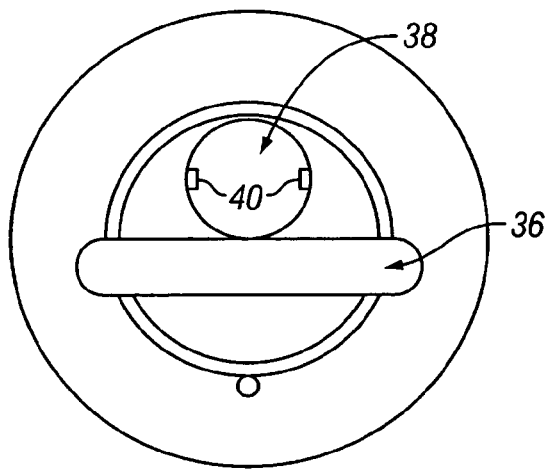
FIG. 9 is a bottom plan view of the anchor ring of FIG. 7.

FIGS. 1-4 show a nonremovable tube fitting or member 10 which can be inserted into a container to access the interior of the container. The nonremovable tube fitting 10 includes an anchor ring 12, an anchor 14 coupled to the anchor ring 12, and a tube 16 disposed adjacent the anchor 14. The anchor 14 and the tube 16 are inserted through the interior of the anchor ring 12. As seen in FIGS. 5 and 6, the anchor 14 includes a proximal head 24 and a distal cross member 26 which are connected by a flexible region 28. The cross member 26 extends outwardly in two generally opposite directions. The flexible region 28 is resiliently flexible due to the smaller cross section as compared to the proximal portion 29 of the anchor 14 and the cross member 26. Other suitable ways of providing a resiliently flexible region 28 may be used. The anchor 14 serves as a capture or catch member. The flexible region 28 allows the distal cross member 26 to rotate with respect to the proximal head 24, and may be made of a low density polyethylene sheet (e.g., about 3/16 inch in thickness) or the like. In the specific embodiment, the anchor 14 has a generally uniform thickness, as illustrated in FIG. 6. As shown in FIGS. 7-9, the anchor ring 12 includes an enlarged proximal cap 30 having a proximal end 32, and a distal end 34 disposed on the opposite side. A hollow slot 36 extends from the proximal end 32 to the distal end 34 for receiving the anchor 14. An elongated hole 38 extends from the proximal end 32 to the distal end 34 for receiving the tube 16. The hole 38 desirably includes unidirectional tube retaining barbs 40 that allow the tube 16 to be inserted through the hole 38 from the proximal end 32 to the distal end 34 but does not allow the tube 16 to be withdrawn in the opposite direction. The anchor ring 12 may be made of any suitable material, including plastic materials such as polypropylene.

Figure 10:
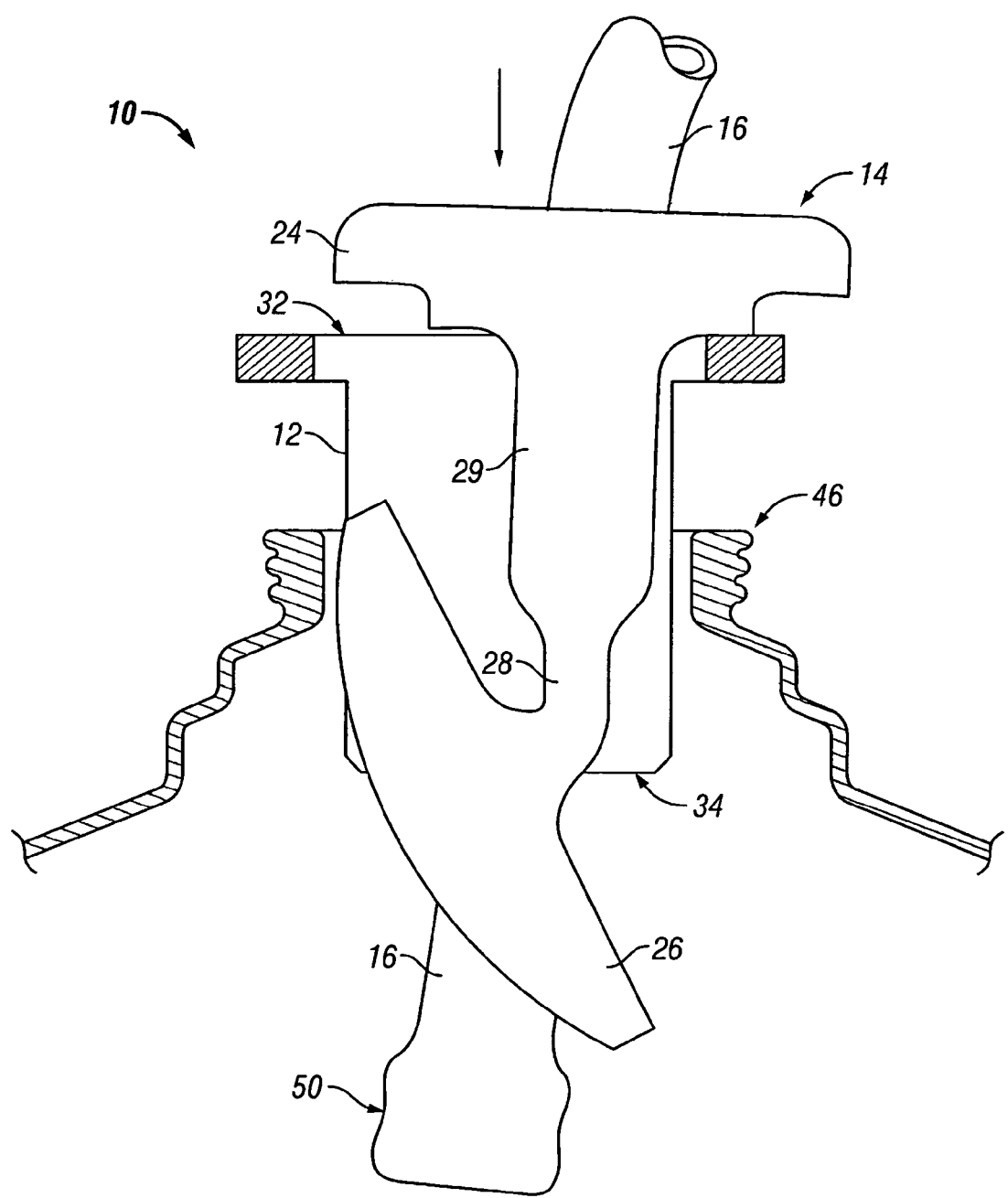
FIG. 10 is an elevational view of the nonremovable tube fitting of FIG. 1 illustrating installation of the fitting into a container.
Figure 11:
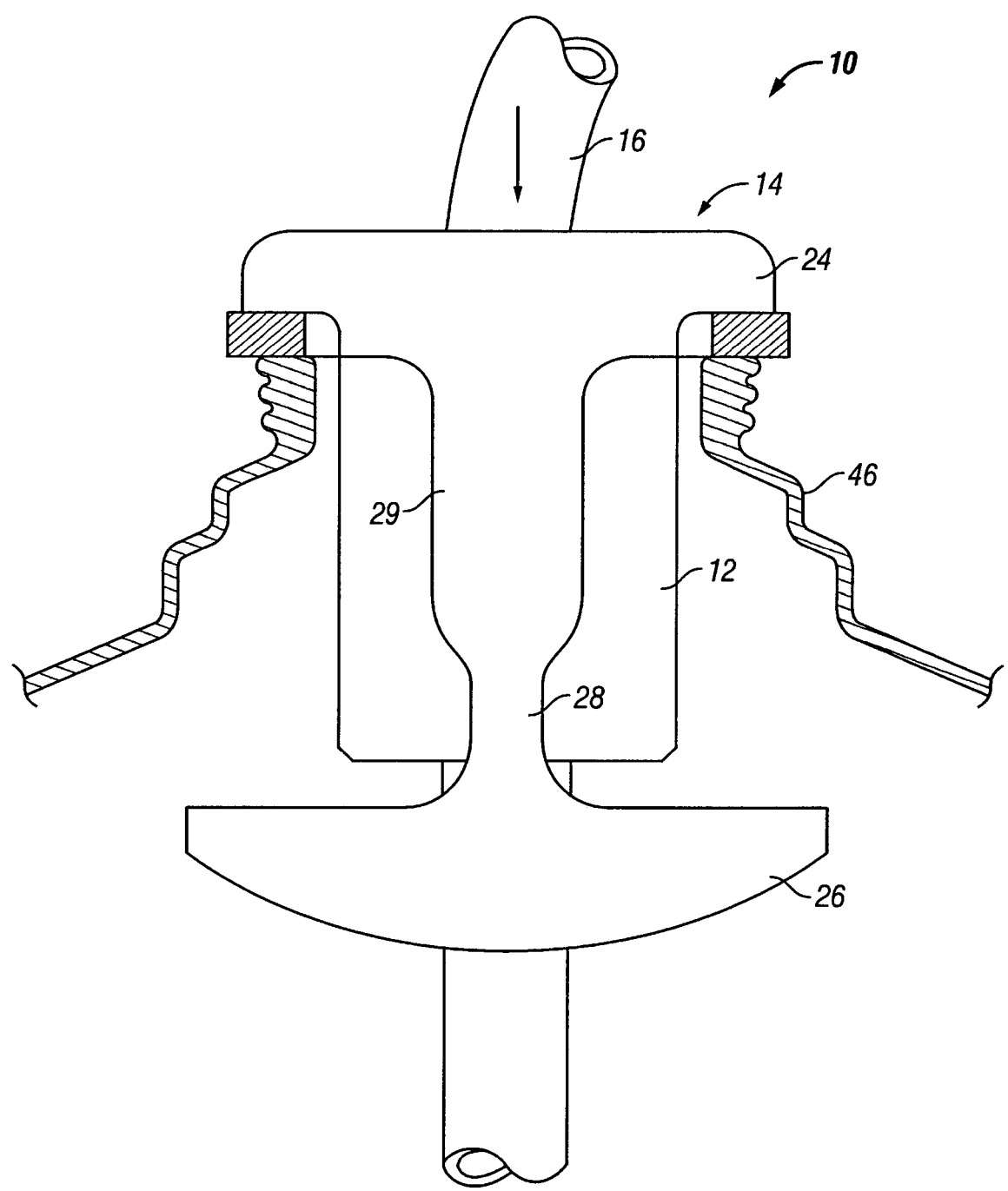
FIG. 11 is an elevational view of the nonremovable tube fitting of FIG. 10 after installation into the container.
Figure 12:
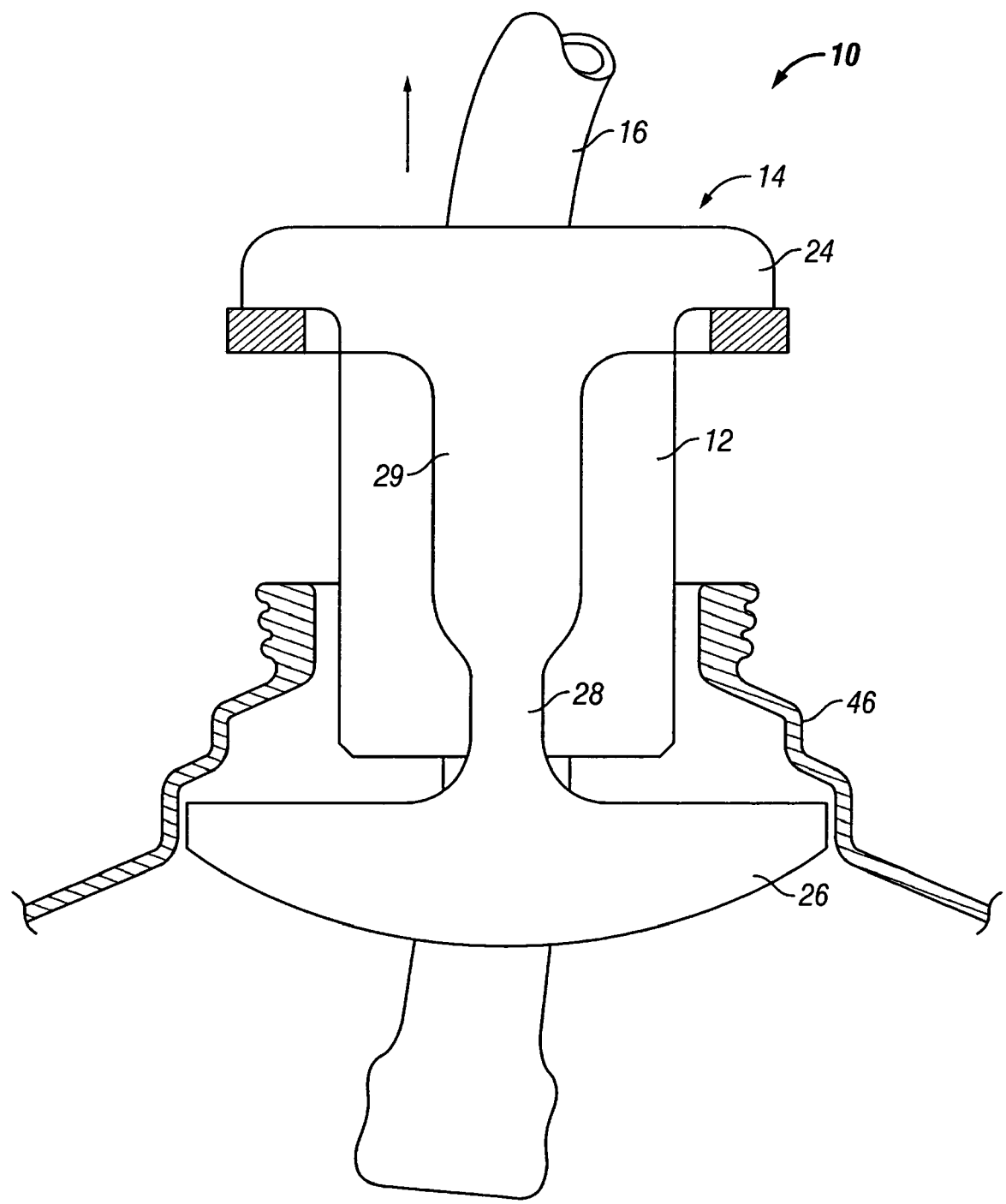
FIG. 12 is an elevational view of the nonremovable tube fitting of FIG. 11 illustrating the nonremovable feature of the fitting after installation into the container.

FIG. 10 shows the insertion of the nonremovable tube fitting 10 through an opening of a container 46. The anchor ring 12 is placed over the opening of the container 46. The anchor 14 is inserted through the slot 36 of the anchor ring 12 by bending the distal cross member 26 at the flexible region 28 with respect to the proximal portion 29. In the contracted position, the cross member 26 has a lateral dimension sufficiently small to be inserted through the opening of the container 46. In the embodiment shown, the contracted position is the deformed position at which the anchor 14 is deformed. The tube 16 is inserted into the hole 38 of the anchor ring 12, typically from the proximal end 32 to the distal end 34 of the anchor ring 12. In another embodiment, the tube 16 may be inserted from distal end 34 to the proximal end 32 of the anchor ring 12, and includes an enlarged end 50 to prevent the tube 16 from sliding through the hole 38 and be separated from the anchor ring 12. FIG. 11 shows the nonremovable tube fitting 10 after insertion into the container 46, with the anchor ring 12 and proximal head 24 of the anchor 14 covering the opening of the container 46. Once installed in the container 46, the cross member 26 of the anchor 14 in the expanded position prevents the nonremovable tube fitting 10 from being removed from the container 46 through the opening, as illustrated in FIG. 12. In the embodiment shown, the expanded position is the undeformed position at which the anchor 14 is not deformed (i.e., the cross member 26 is not bent at the flexible region 28 with respect to the proximal portion 29). The cross member 26 in the installed position has a large lateral span that exceeds the size of the opening of the container 46.

Figure 13:
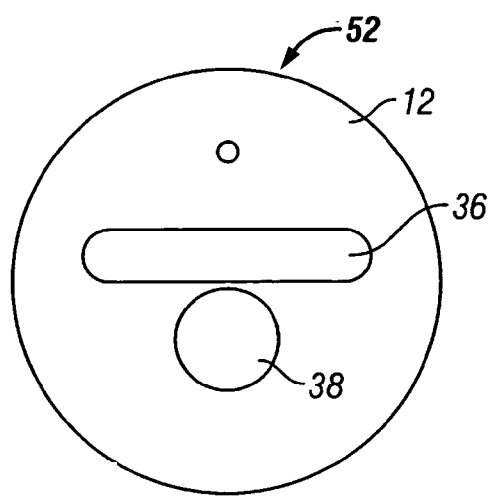
FIG. 13 is a to plan view of a nonremovable tube fitting according to another embodiment of the present invention.
Figure 14:
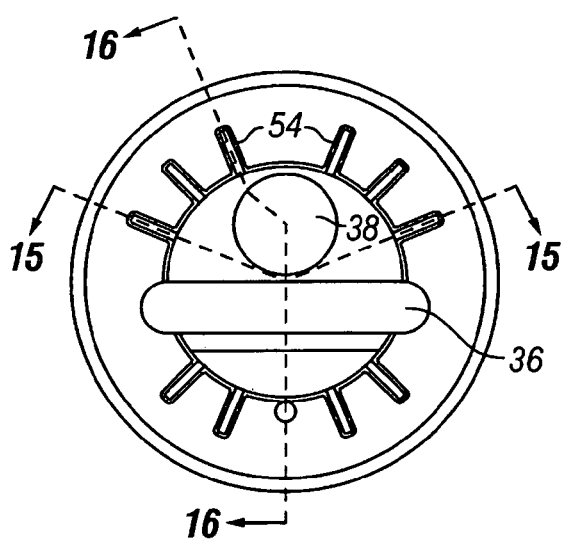
FIG. 14 is a bottom plan view of the nonremovable tube fitting of FIG. 13.
Figure 15:
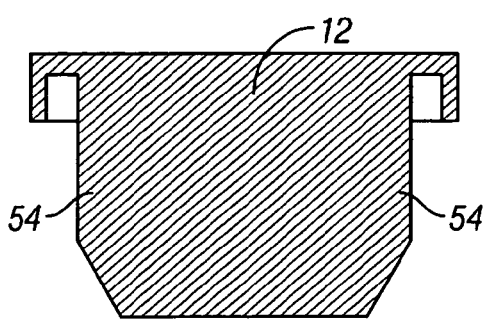
FIG. 15 is a cross-sectional view of the nonremovable tube fitting of FIG. 14 along 15-15.
Figure 16:
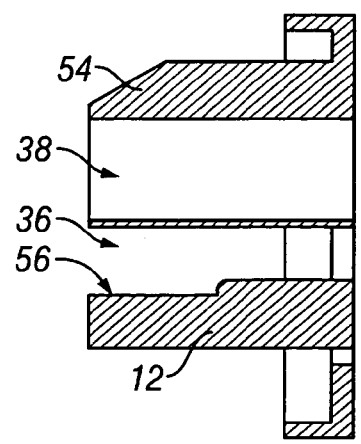
FIG. 16 is a cross-sectional view of the nonremovable tube fitting of FIG. 14 along 16-16.
Figure 17:
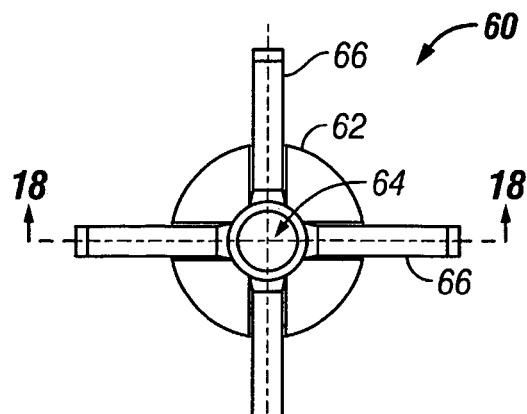
FIG. 17 is a top plan view of the nonremovable tube fitting according to another embodiment of the present invention.
Figure 18:
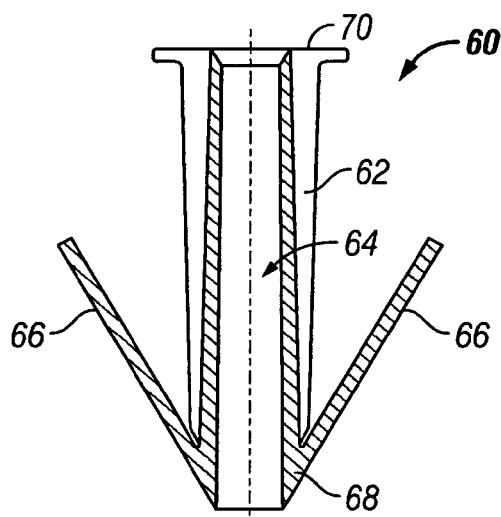
FIG. 18 is a cross-sectional view of the nonremovable tube fitting of FIG. 17 along 18-18.
Figure 19:
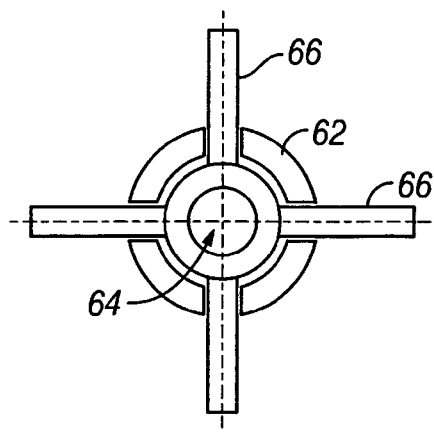
FIG. 19 is a bottom plan view of the nonremovable tube fitting of FIG. 17.

FIGS. 13-16 show another embodiment of a nonremovable tube fitting 52 which has many of the same features as the fitting 10 of FIGS. 1-10. The same reference characters are used for identical parts for convenience. As seen in FIG. 13, the tube fitting 52 also has an anchor ring 12, an anchor slot 36 to receive an anchor, and a hole 38 to receive a tube to be disposed adjacent the anchor. The tube fitting 52 further includes a plurality of flexible ribs 54 extending from the side of the anchor ring 12, as best seen in FIGS. 14 and 15. These ribs 54 may be made of a low density polyethylene or the like, and may be formed with the anchor ring 12 by injection molding. FIG. 14 shows ten flexible ribs 54 extending radially from and distributed circumferentially around the side of the anchor ring 12. When inserted into a container, the flexible ribs 54 bend and deform to produce an interference with the opening of the container and provide a snug fit with the container. As seen in FIGS. 14 and 16, the anchor slot 36 may be enlarged with a relief or undercut 56 to form an enlarged portion at the distal end to allow the flexible portion 28 of the anchor to move or swing more freely during insertion of the anchor through the anchor slot 36.

FIGS. 17-20 show yet another embodiment of a nonremovable tube fitting 60, which includes a hollow body 62 having a generally cylindrical elongated hole 64. One or more distal capture or catch members in the form of fingers 66 extending from a region at or near the distal end 68 of the hollow body 62. When a plurality of fingers 66 are used, they may be generally evenly distributed around the circumference of the hollow body 62. The fingers 66 can bend around the joint at the distal end 68 with respect to the hollow body 62, which provides some flexibility to the fingers 66. Due to the orientation of the fingers 66 toward the proximal end 70, the fingers 66 will bend relatively easily to a position toward the proximal end 70 against the external wall of the hollow body 62. In the contracted position, the fingers 66 are deformed and are generally parallel to the axis of the hollow body 62. The flexibility will be limited in the opposite direction due to the original orientation of the fingers 66, so that it will be more difficult, desirably substantially more difficult, for the fingers 66 to bend downward away from both the proximal end 70 and the distal end 68. In alternative embodiments, the fingers 66 may extend from a region spaced from the distal end 68, but the region is preferably closer to the distal end 68 than to the proximal end 70. A proximal cap 72 is provided at the proximal end 70. The nonremovable tube fitting 60 may be made of any suitable materials, such as plastic materials.

Figure 20:
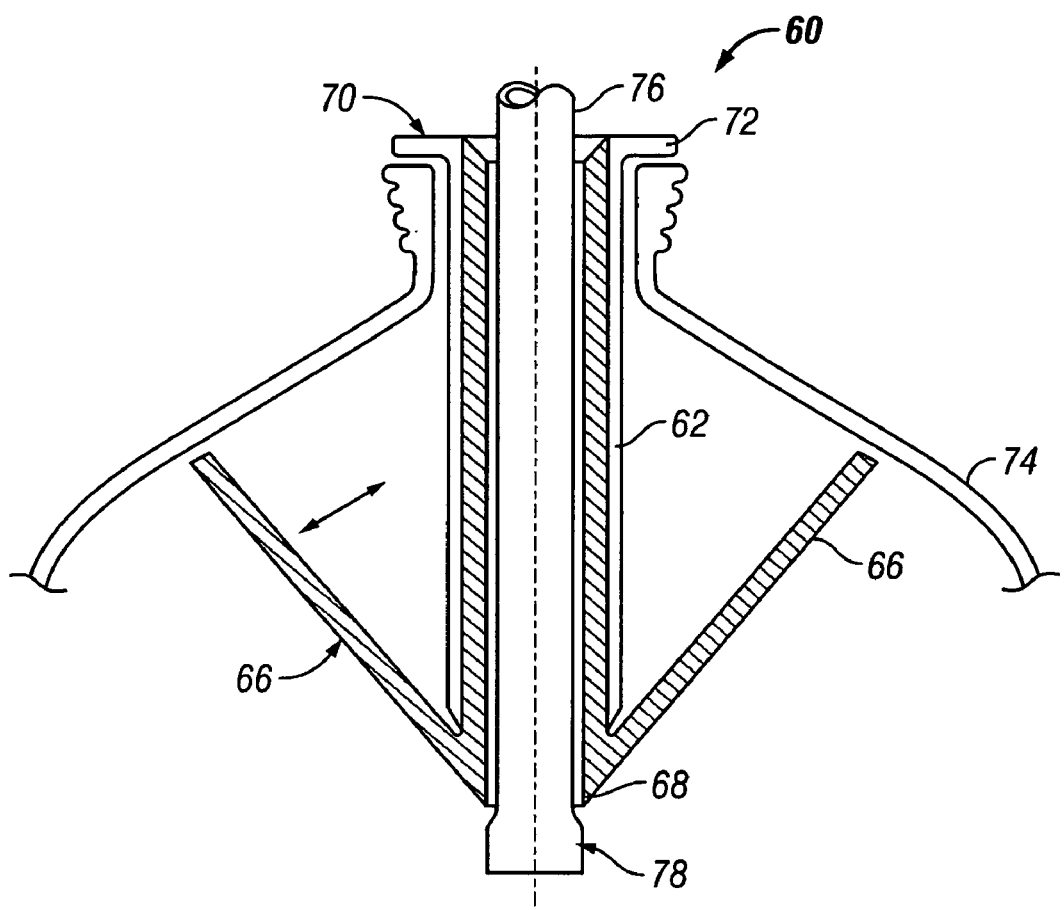
FIG. 20 is a partial cross-sectional view of the nonremovable tube fitting of FIG. 17 installed into a container.
Figure 21:
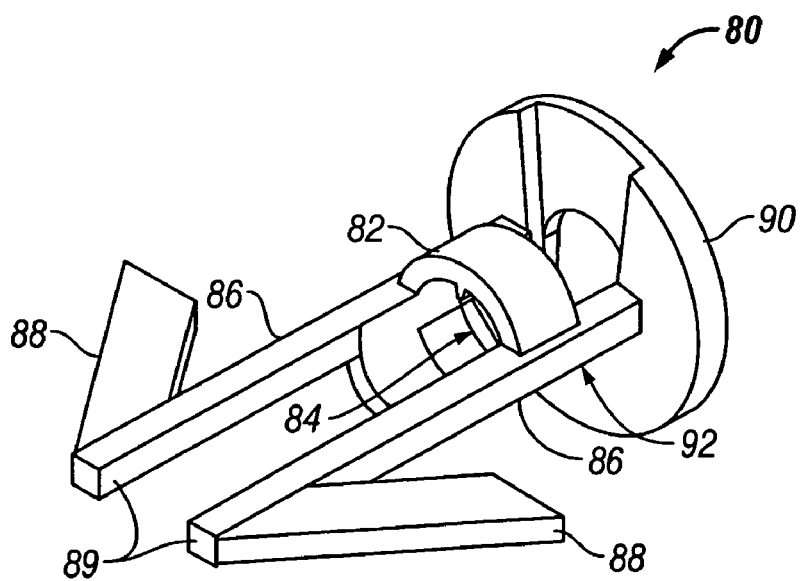
FIG. 21 is a perspective view of the nonremovable tube fitting according to another embodiment of the present invention.
Figure 24:
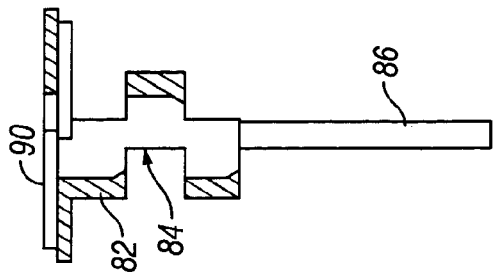
FIG. 24 is a cross-sectional view of the nonremovable tube fitting of FIG. 22 along 24-24.
Figure 25:
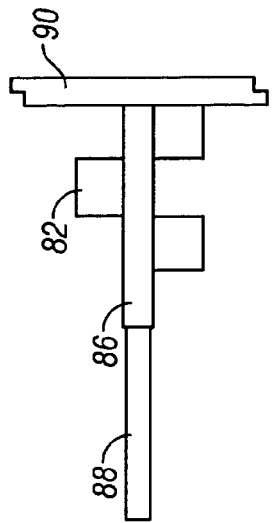
FIG. 25 is a side view of the nonremovable tube fitting of FIG. 23.
Figure 22:
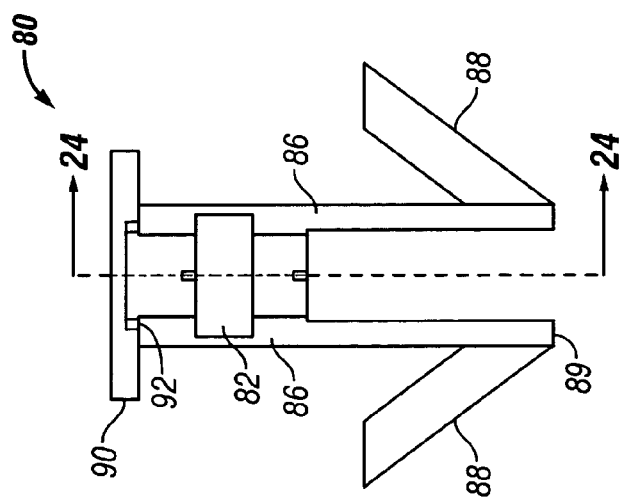
FIG. 22 is a front elevational view of the nonremovable tube fitting of FIG. 21.
Figure 23:
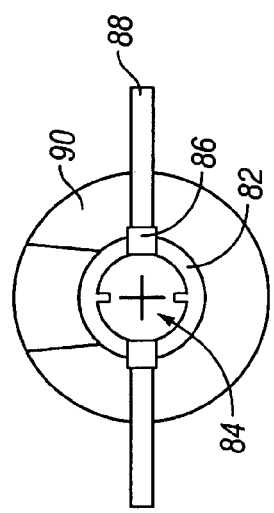
FIG. 23 is a bottom plan view of the nonremovable tube fitting of FIG. 22.

FIG. 20 shows the insertion of the nonremovable tube fitting 60 through an opening of a container 74. The proximal cap 72 has an enlarged cross-section which is larger in size than the opening of the container 74 so as to cover the opening. The fingers 66 in the contracted position deform and bend upward toward the proximal end 70 to facilitate insertion of the nonremovable tube fitting 60 through the opening into the container 74. Upon entering the container 74, the fingers 66 resiliently return to their original, undeformed positions as shown in FIG. 20. The angle at which the fingers 66 make with the external wall of the hollow body 62 may generally be about 20°-80°, and is typically about 30°-60°. A tube 76 is inserted through the elongated hole 64 of the hollow body 62. The tube 76 may be inserted from the proximal end 70 to the distal end 68, and barbs may be provided in the internal surface of the hole 64 to prevent the tube 76 from being withdrawn in the opposite direction. Alternatively, the tube 76 may be preinstalled by inserting through the elongated hole 64 from the distal end 68 to the proximal end 70, and an enlarged distal end 78 may be provided to prevent the tube 76 from being pulled out from the nonremovable tube fitting 60. Once installed in the container 74, the fingers 66 prevent the nonremovable tube fitting 10 from being removed from the container 74 through the opening by bearing against the interior surface of the container 74, since the fingers 66 in the undeformed position have a large lateral span that exceeds the size of the opening of the container 74.

FIGS. 21-25 show still another embodiment of a nonremovable tube fitting 80, which includes a hollow body 82 having a generally cylindrical hole 84. The hollow body 82 is shorter than the hollow body 62 of the fitting 60. One or more capture or catch members, in the form one or more feet 88 connected to one or more legs 86, are connected to the hollow body 82 and extend in the distal direction. The embodiment shown has two legs 86 with two feet 88 disposed on opposite sides of the hole 84 of the hollow body 82 and connected at the distal ends 89 of the legs 86. A proximal cap 90 is provided at the proximal end 92. The feet 88 are oriented toward the proximal end 92 in a manner similar to the fingers 66 in the fitting 60. The angle which the feet 88 make with the legs 86 may generally be about 20°-80°, and is typically about 30°-60°. The feet 88 can bend around the joint at the distal ends 89 with respect to the legs 86. In the contracted position, the feet 88 are deformed and are generally parallel to the axis of the hollow body 82 or to the legs 86. Due to the orientation of the feet 88 toward the proximal end 92, the feet 88 will bend more easily to a position toward the proximal end 92 against the legs 86 than in the opposite direction away from both the proximal end 92 and the distal ends 89. The insertion of the nonremovable tube fitting 80 and function of the capture members in the form of feet 88 are similar to those of the fingers 66 in the fitting 60.

In use, the distal end of the tube is inserted into the interior of the container. The proximal end of the tube may be connected to a pump or the like to pump the content of the container out through the tube. The nonremovable tube fitting may be disposable with the container after the content of the container is emptied.

The above-described arrangements of apparatus and methods are merely illustrative of applications of the principles of this invention and many other embodiments and modifications may be made without departing from the spirit and scope of the invention as defined in the claims. For example, while the embodiments each show a capture member that is deformed in the contracted position and undeformed in the expanded position, other embodiments may provide a capture member that may switch between the contracted position and the expanded position in other ways. A mechanism may cause the capture member to move from the contracted position to the expanded position in a manner similar to the opening of an umbrella. The scope of the invention should, therefore, be determined not with reference to the above description, but instead should be determined with reference to the appended claims along with their full scope of equivalents.

What is claimed is:

1. A nonremovable tube fitting for providing access for a tube through an opening of a container to access an interior of the container, the fitting and the container forming an assembly comprising:
   the container;
   a hollow body having a proximal end and a distal end, the hollow body being partially insertable from the distal end through the opening of the container into the interior of the container, the hollow body including a proximal cap near the proximal end configured to be coupled to the opening of the container, the hollow body including a hole for receiving the tube and a slot for receiving a capture member into the interior of the container, said slot having a longer side and a shorter side, wherein the hole and the slot are separated and extending from the proximal end to the distal end of the hollow body;

a capture member coupled with the hollow body, said capture member having a distal end and a proximal end, the capture member comprising a proximal head having a dimension larger than the longer side of said slot, a proximal portion connecting said proximal head to a flexible region, the flexible region formed about the longitudinal centerline of the capture member and adjacent to the distal end of the capture member, and a cross member connected and centered with respect to said flexible region, the cross member having its largest dimension larger than the opening of the container, said capture member being movable between a contracted position formed by a bending of the flexible region and an expanded position formed by a returning of the flexible region to its undeformed position, the capture member in the contracted position having a lateral dimension sufficiently small to be inserted through said slot into the interior of the container, the capture member returning to the expanded position upon insertion into the interior of the container, the capture member in the expanded position protruding outwardly from a region near the distal end of the hollow body so as to prevent the capture member and the hollow body from being pulled out through the opening in the container and separated from the container; and a tube inserted through said hole in said hollow body.

2. The fitting of claim 1 wherein the capture member comprises a cross member extending outwardly from the hollow body in two generally opposite directions.

3. The fitting of claim 2 wherein the capture member comprises a proximal portion coupled with the proximal end of the hollow body and a flexible portion connected between the proximal portion and the cross member, the cross member being configured to bend at the flexible portion with respect to the proximal portion from the expanded position to the contracted position.

4. The fitting of claim 3 wherein the flexible portion is smaller in cross-section than the proximal portion.

5. The fitting of claim 3 wherein the cross member of the capture member is configured to be bent at the flexible portion and inserted through a slot of the hollow body in the contracted position, and to return to the expanded position after passing through the distal end of the hollow body.

6. The fitting of claim 5 wherein the proximal portion of the capture member includes a proximal head which is larger in cross-section than the slot of the hollow member to prevent the proximal portion from passing through the slot to the distal end of the hollow member.

7. The fitting of claim 1 wherein the hollow body includes unidirectional tube retaining barbs in the hole.

8. The fitting of claim 1 wherein the capture member is undeformed in the expanded position and is deformed in the contracted position, wherein the capture member is resiliently deformable from the undeformed position to the deformed position during insertion through the opening of the container, and wherein the capture member resiliently returns to the expanded position upon insertion into the container.

9. The fitting of claim 1 wherein the tube has an enlarged end adjacent to said distal end of said hollow body.

* * * * *